(12) United States Patent
Mathur (10) Patent No.: US 11,473,852 B2
(45) Date of Patent: Oct. 18, 2022

(54) THERMOCLINE THERMAL ENERGY STORAGE IN MULTIPLE TANKS

(71) Applicant: TERRAFORE TECHNOLOGIES, LLC, Minneapolis, MN (US)

(72) Inventor: Anoop Mathur, Minneapolis, MN (US)

(73) Assignee: Terrafore Technologies, LLC, Minneapolis, MN (US)

( * ) Notice: Subject to any disclaimer, the term of this patent is extended or adjusted under 35 U.S.C. 154(b) by 0 days.

(21) Appl. No.: 17/601,050

(22) PCT Filed: Apr. 4, 2019

(86) PCT No.: PCT/US2019/025900
§ 371 (c)(1),
(2) Date: Oct. 1, 2021

(87) PCT Pub. No.: WO2020/204933
PCT Pub. Date: Oct. 8, 2020

(65) Prior Publication Data
US 2022/0099384 A1 Mar. 31, 2022

(51) Int. Cl.
*F28D 20/02* (2006.01)
*F28D 20/00* (2006.01)

(52) U.S. Cl.
CPC ....... *F28D 20/023* (2013.01); *F28D 20/0034* (2013.01); *F28D 20/0039* (2013.01); *F28D 20/0056* (2013.01); *F28D 2020/0082* (2013.01)

(58) Field of Classification Search
CPC . Y02E 60/14; F28D 20/0034; F28D 20/0039; F28D 2020/0065; F28D 2020/0082; F28D 2020/0047
USPC .......................................................... 60/659
See application file for complete search history.

(56) References Cited

U.S. PATENT DOCUMENTS

| | | | |
|---|---|---|---|
| 2012/0118554 A1* | 5/2012 | Mathur | F28D 20/02 165/287 |
| 2014/0260376 A1 | 9/2014 | Kopko et al. | |
| 2016/0076821 A1* | 3/2016 | Kopko | F25B 40/02 165/10 |
| 2017/0307302 A1 | 10/2017 | Jacobs et al. | |
| 2018/0179955 A1 | 6/2018 | Apte et al. | |
| 2021/0310747 A1* | 10/2021 | Geissbühler | F28D 20/0039 |

* cited by examiner

Primary Examiner — Mickey H France
(74) Attorney, Agent, or Firm — Patterson Thuente Pedersen, P.A.

(57) ABSTRACT

A method of optimizing thermocline zone within a thermal storage system including a plurality of storage tanks fluidly coupled to one another in series, to effectively form a single tank having an equivalent height of the combined height of the plurality of storage tanks. The method including identifying a thermocline zone, computing an average temperature (Tave) of the thermocline zone, directing thermal storage fluid from a bottom of an initial storage tank through a heat source heat exchanger, and terminating fluid flow from the bottom of the initial storage tank and directing thermal storage fluid from a bottom of a first subsequent storage tank when a temperature of the thermal storage fluid exiting the bottom of the initial storage tank reaches Tave.

15 Claims, 10 Drawing Sheets

EXAMPLE OF A THERMAL LOAD / HEAT EXCHANGER

FIG. 4A

EXAMPLE OF A STEAM GENERATOR FOR STEAM TURBINE AND POWER GENERATION

THERMOCLINE THERMAL ENERGY STORAGE IN MULTIPLE TANKS

RELATED APPLICATION INFORMATION

This application is a National Phase entry of PCT Application No. PCT/US2019/025900, filed Apr. 4, 2019, the disclosure of which is fully incorporated herein by reference in its entirety.

TECHNICAL FIELD

The present disclosure relates generally to energy storage, and more particularly to a system and method for improving the efficiency of a thermal energy storage system by utilizing a plurality of tanks connected in series to minimize degradation of a thermocline zone during charging and discharging, and to maximize the capacity to store energy.

BACKGROUND

Worldwide, there is an ever-growing demand for electricity due to increasing populations and technology advancements that require the use of electricity. At the same time, there is an increasing push to harness renewable resources of energy to help meet these increasing electricity demands to offset and/or replace traditional carbon-based energy plants, which rely on depleting natural fossil fuel resources and contribute to pollution and global warming.

Many solutions have been developed to collect and take advantage of renewable sources of energy, such as solar collectors, bio-gas boilers, etc. Solar collectors, such as an array of mirrors focus sunlight on a heat source heat exchanger containing a thermal energy storage fluid which absorbs the sun's radiant heat energy. The heated fluid can then be pumped to a discharge heat exchanger or turbine where it can be utilized to heat water to produce steam, thereby driving a turbine to generate electricity.

Unfortunately, when the sun is not available, solar mirror arrays are unable to heat the thermal energy storage fluid. In order to maintain uninterrupted power generation, some form of energy storage is needed to store excess energy when the sun is available, as well as to support energy demands when the peak energy demand exceeds the steady-state output.

Several solutions have been developed to store the heated fluid for use in non-energy generating times. In some systems, multiple storage containers or tanks can be utilized to store the fluid during different phases of the cycle. For example, a first tank can store cold fluid after it has been run through the discharge heat exchanger, while a second tank can store hot fluid after it has been heated through a heat source heat exchanger. In other systems, in part to reduce infrastructure costs, the system can utilize a single tank to store both the hot and cold thermal energy storage fluids in the same tank. For example, U.S. Pat. No. 8,554,377, assigned to Terrafore, Inc. of Riverside, Calif. (assignee of the present application), the contents of which are hereby incorporated by reference herein, discloses such a system.

In a single tank system, a thermocline can be utilized, wherein less dense hot fluid is stratified (i.e., floats) over more dense cold fluid. In operation, cold fluid is extracted from the bottom of the tank, heated in the heat source heat exchanger, and returned to the top of the storage tank. After some period of storage, the hot fluid can be extracted from the top of the tank, routed through a discharge heat exchanger, and returned to the bottom of the storage tank.

The fluid in the tank can be a liquid or a mixture of solid particles and liquid (often referred to as "dual media"). If dual media is used the heat is transferred to the solid and heat is stored in both liquid and solid.

As is well known in the art, the density of hot fluid is lower than the density of the cold fluid. The relatively hot or less dense fluid will stay above the cold or more dense fluid with very little mixing. This separation of the relatively less dense hot fluid from the relatively denser cold fluid is known as thermal stratification or thermocline. In a perfectly stratified thermocline, the fluid at higher temperature will stay on top of the fluid at lower temperature without mixing. However, in a typical thermal storage tank, there exists a transition layer between the hot and cold region. This transition layer which is of a certain width is called the thermocline zone.

As mentioned, the fluid in the storage tank can be a liquid or a dual media of solid particles and liquid. In the case of dual media, the tank is packed with the solid particles (typically measuring about one inch in diameter) and the space between the particles is filled with the liquid. Liquid is pumped in and out of the tank to collect heat (charge the tank) and give up heat in a discharge heat exchanger (discharge the tank). Various solid and liquid combinations can be used depending on the desired storage temperatures, compatibility of solid with liquid, availability of material and cost. Examples of solid are rock, quartzite, granite, ceramic particles, phase change capsules, etc. Examples of liquid are commercially available heat transfer fluids and molten salt mixtures.

During operation, the thermocline zone moves down the tank as hot fluid is added to the tank (i.e., during charging), and moves up the tank when hot fluid is extracted from the top (i.e., during discharge). In a fully charged tank, the thermocline zone is near the bottom. In a fully discharged tank, the thermocline zone is at the top.

Initially the width of the thermocline zone is between about ten to fifteen percent of the total height of the tank. One shortcoming of thermocline energy storage is that it is difficult to maintain this initial design width of the thermocline zone in the storage tank. This is because, the process of repeatedly extracting cold fluid from the tank and returning hot fluid to the top during the charge and discharge process, results in the widening of the thermocline zone. This widening, referred to as the degradation of the thermocline, causes a decrease in the storage capacity or utilization factor. A definition of the utilization factor is the ratio of the total height of the fluid in the tank less the height of the thermocline zone divided by the total height of the fluid. In addition to the repeated charge and discharge cycles, there are other factors that cause degradation of thermocline, such as conduction between layers, mixing of fluid due to turbulence when fluid is extracted from the tank or added to the tank, and mixing as a result of an increase in the velocity of the fluid.

Figure 1:
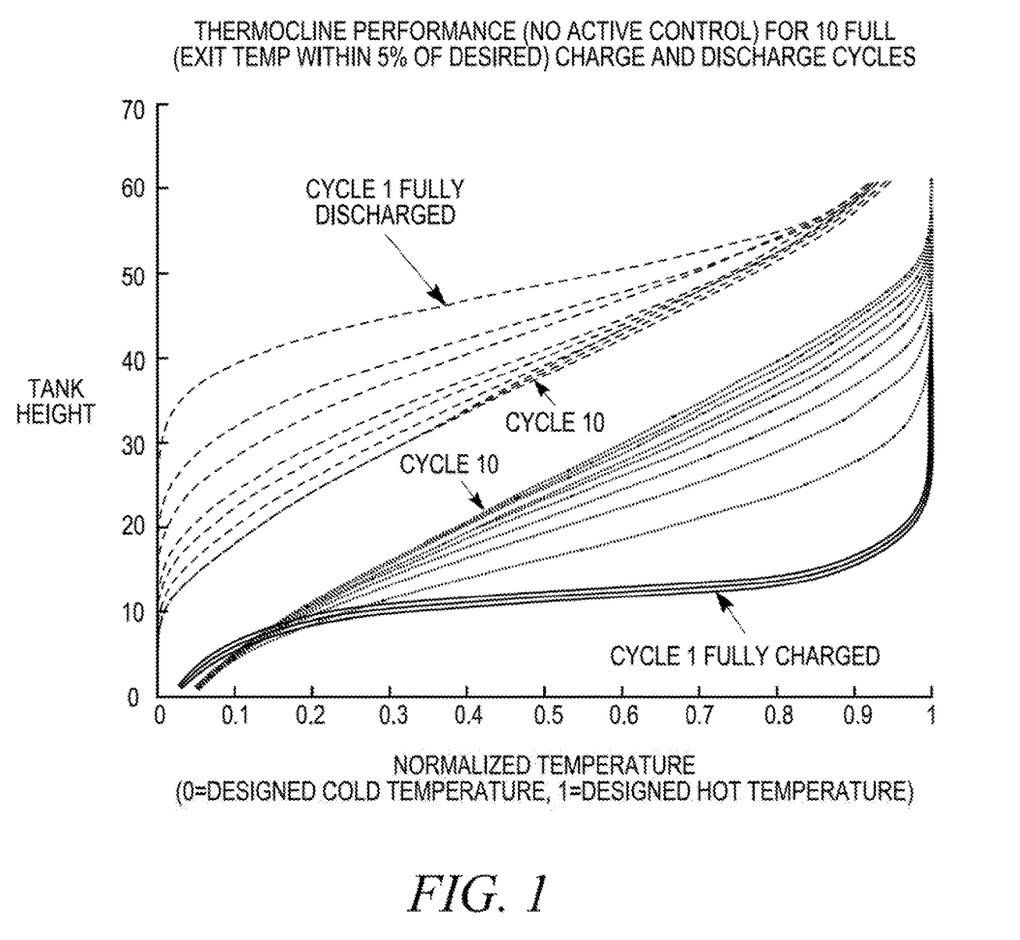
FIG. 1 is a temperature graph depicting thermocline zone degradation of the prior art.

With as few as ten charge and discharge cycles, degradation of the thermocline zone can result in a fifty percent reduction in storage capacity. FIG. 1 depicts an exemplary temperature profile in a storage tank over the course of ten charge and discharge cycles. The y-axis represents the height of the tank, and the x-axis represents the temperature. The top set of curves represent the profile of a fully charged tank, and the bottom set of curves represent the profile of a fully discharged tank. The area between the top and bottom curves is a measure of the utilization factor. As can be seen, this area decreases as the number of charge and discharge cycles increases, with the tenth cycle showing a reduction of approximately fifty percent.

One approach to restoring a degrading thermocline, is to overdesign the storage tank system, thereby enabling at least one tank to be completely drained and refilled during the discharge/charge process to reestablish the thermocline. This approach, however, adds significantly to the overall complexity and cost of the thermal energy system. Another approach is to manage the thermocline with distributors and fluid droplets located at various heights within the tank, such as that described in U.S. Pat. No. 8,554,377. Although these approaches work reasonably well, further advances to improve the overall efficiency of thermal energy storage systems and decrease costs are desirable.

The present disclosure addresses this concern.

SUMMARY OF THE DISCLOSURE

Embodiments of the present disclosure provide a thermal energy storage system for optimally designing and automatically managing a thermocline zone using multiple tanks connected in series to achieve the effect of a single tall tank (i.e., a tank having a high tank height to diameter ratio). The use of multiple tanks in this manner enables the reestablishment of a thermocline zone each time the thermocline passes through the bottom or top of a tank, thereby minimizing degradation of the thermocline zone during charging and discharging. Additionally, during charging, the thermal energy storage system can draw thermal storage fluid from multiple tanks to ensure that the fluid is cool enough to maximize efficient use of available energy during charging, particularly as the thermocline approaches the bottom of each of the tanks during the charging process.

One embodiment of the present disclosure provides a method of optimizing a thermocline zone within a thermal storage system including a plurality of storage tanks fluidly coupled to one another in series, to effectively form a single tank having an equivalent height of the combined height of the plurality of storage tanks. The method can include the steps of: identifying a thermocline zone between a hot thermal storage fluid and a cold thermal storage fluid within a plurality of storage tanks; computing the average temperature (Tave) of the thermocline zone; directing thermal storage fluid from a bottom of an initial storage tank of the plurality of storage tanks containing the thermocline zone to a heat source heat exchanger for heating; and terminating fluid flow from the bottom of the initial storage tank and directing thermal storage fluid from a bottom of a first subsequent storage tank of the plurality of storage tanks, when a temperature of the thermal storage fluid exiting the bottom of the initial storage tank reaches Tave.

In one embodiment, the method can further include the step of directing fluid flow from the bottom of one or more storage tanks of the plurality of storage tanks to the heat source heat exchanger to maximize efficient use of available energy during heating. In one embodiment, the method can further include the step of returning the thermal storage fluid passing through the heat source heat exchanger to a top of at least one of the pluralities of storage tanks. In one embodiment, the method can further include terminating a fluid flow from the bottom of the first subsequent storage tank and directing thermal storage fluid from a bottom of one or more additional subsequent storage tanks of the plurality of storage tanks when a temperature of the thermal storage exiting the bottom of the plurality of storage tanks reaches Tave. In one embodiment, the method further includes the step of ceasing all fluid flow when thermal storage fluid exiting a bottom of the one or more storage tanks reaches Tave.

In one embodiment, a setpoint temperature (Tset) of fluid exiting the heat source heat exchanger is limited by controlling a flow rate of the thermal storage fluid passing through the heat source heat exchanger between a minimum flow rate and a maximum flow rate. In one embodiment, the thermocline zone is identified using a combination of one or more temperature sensors within the plurality of storage tanks. In one embodiment, the heat source heat exchanger includes at least one of a solar receivers and/or renewable thermal sources.

In one embodiment, the thermal storage fluid is made of a dual media including a combination of solid media and liquid media. In one embodiment, the solid media comprises at least one of rock, quartzite, granite and/or ceramic particles. In one embodiment, the solid media comprises phase change capsules including an inorganic salt mixture configured to store thermal energy via a phase change. In one embodiment, the liquid media comprises at least one of a hydrocarbon oil and/or molten salt mixture.

In one embodiment, the method further includes the step of directing thermal storage fluid from a top of one or more storage tanks of the plurality of storage tanks to a discharge heat exchanger. In one embodiment, the method further includes the step of directing thermal storage fluid from the discharge heat exchanger to a bottom of at least one of the pluralities of storage tanks. In one embodiment, the discharge heat exchanger includes at least one of a power generator and/or steam turbine power generator.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Figure 2A:
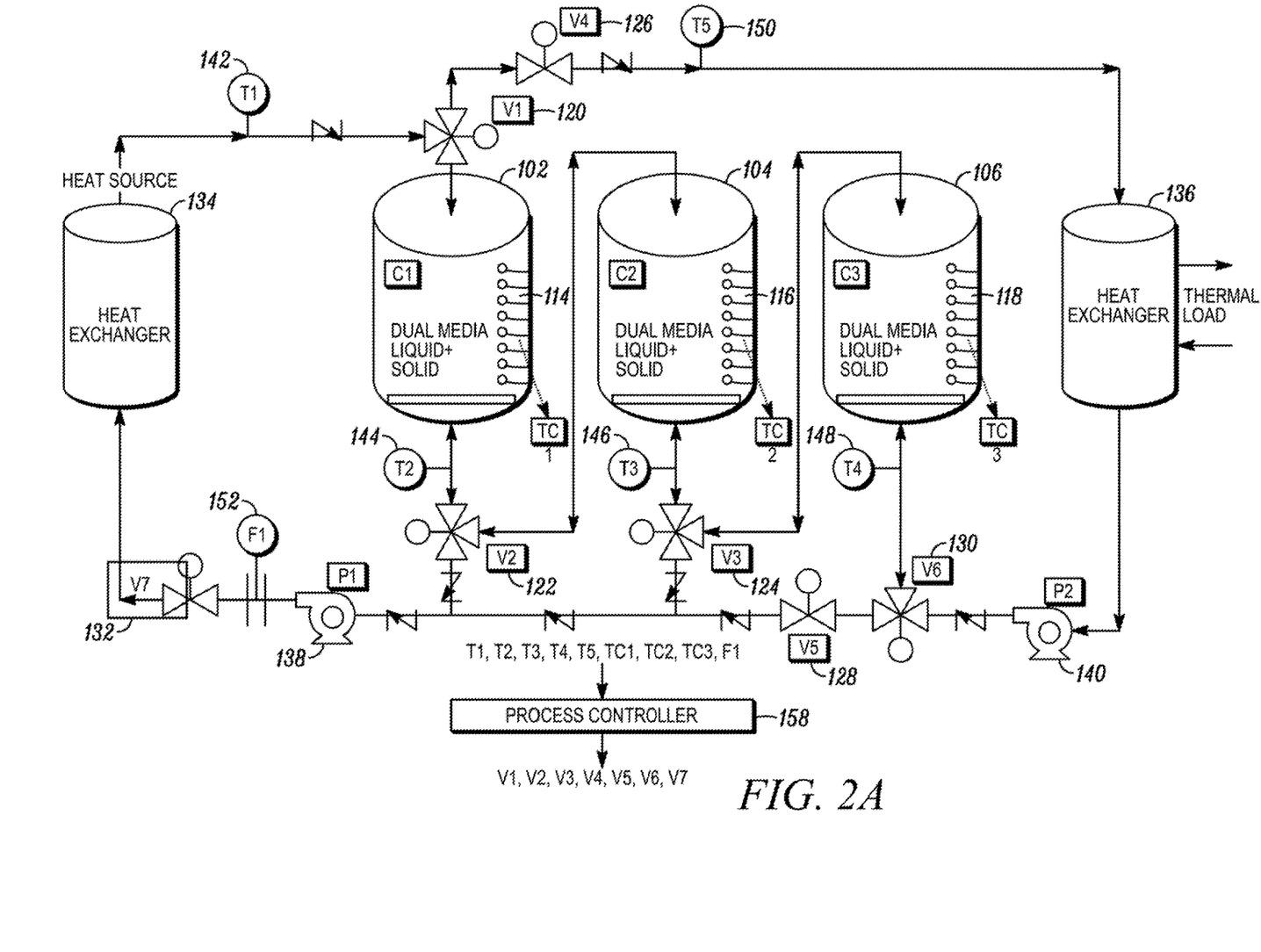
FIG. 2A is a schematic view depicting a thermal storage system, in accordance with a first embodiment of the disclosure.

Referring to FIG. 2A, an illustration of a thermal storage system 100 is depicted in accordance with an embodiment of the disclosure. The thermal energy storage system 100 can include multiple storage tanks configured to store thermal energy storage fluid. Although three storage tanks 102, 104, 106 are depicted, a greater or lesser number of storage tanks are also contemplated. For example, in one embodiment, the thermal energy storage system 100 could utilize four storage tanks.

In one embodiment, the thermal storage fluid can be a dual-media of solid and liquid. In one embodiment, the solid can be comprised of particles and can be made from materials such as rock, quartzite, granite, or ceramic pebbles. In another embodiment, the solid particles can be small generally spherically shaped capsules containing a phase change salt, configured to store thermal energy via a phase change. In one embodiment, the solid particles can have a diameter or cross-sectional width of about 1 inch. The solid can be packed into the storage tanks 102, 104, 106. The liquid, which can be any commercially thermal energy storage fluid such as heat transfer oil, a molten salt mixture (e.g., a mixture of nitrate salts or a mixture of chloride salts), or any commercially available heat transfer fluid (e.g., Dowtherm™, Therminol™ or similar fluid), can circulate throughout the system 100 and fill the space between the solid particles within the storage tanks 102, 104, 106. In yet another embodiment, the thermal energy storage fluid can be a single-phase liquid, with no solid component.

Tanks 102, 104, 106 can be substantially similar in size and construction, and can each may include a plurality of temperature sensors 114, 116, 118 installed within an interior or exterior of each respective tank 102, 104, 106 at spaced intervals along a vertical height of the tank 102, 104, 106. For example, in one embodiment, the plurality of temperature sensors 114, 116, 118 on a given tank 102, 104, 106 can be spaced approximately 0.5 meters apart from one another. The plurality of temperature sensors 114, 116, 118 can be configured to locate and determine a width of the thermocline zone between hot fluid and cold fluid within any given tank 102, 104, 106.

Tanks 102, 104, 106 can be in fluid communication with a plurality of valves 120, 122, 124, 126, 128, 130 and 132 and pumps 138, 140. While seven valves and two pumps are depicted in FIG. 2A, it should be understood that other configurations and numbers of valves and pumps are also contemplated. The valves 120, 122, 124, 126, 128, 130 and 132 and pumps 138, 140 can be utilized to direct the thermal storage fluid through various portions of the thermal storage system during operation, including directing the fluid into and out of the storage tanks 102, 104, 106 and through the heat exchangers 134, 136.

Operation of the thermal storage system 100 can be generally broken into two distinct modes: (1) a charge mode, where heat is added to cold thermal energy storage fluid via an input or heat source heat exchanger 134; and (2) a discharge mode where heat from the hot thermal energy storage fluid is discharged through an output or discharge heat exchanger 136.

Figure 3A:
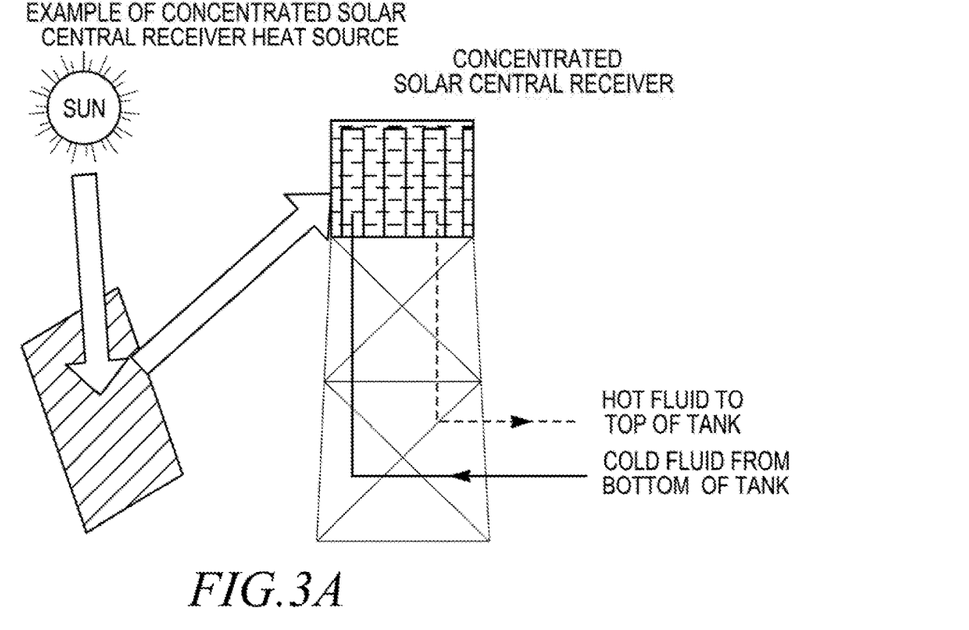
FIG. 3A is a schematic view depicting an exemplary heat source heat exchanger, in accordance with a first embodiment of the disclosure.
Figure 3B:
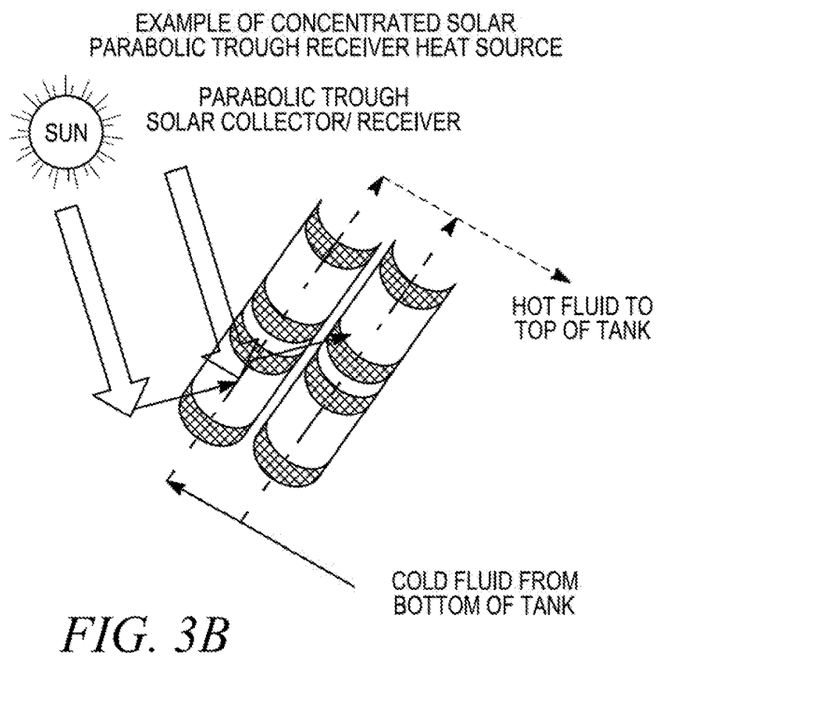
FIG. 3B is a schematic view depicting an exemplary heat source heat exchanger, in accordance with a second embodiment of the disclosure.

In one embodiment, the heat source for the heat source heat exchanger 134 can be a concentrating solar collector, such as a parabolic trough or tower, or some other type of heat source such as an industrial boiler. FIG. 3A depicts an exemplary concentrated solar thermal receiver, frequently referred to as a central receiver, which receives heat from the sun to heat cold fluid. FIG. 3B depicts another example of a heat source in the form of a concentrated solar thermal receiver, frequently referred to as a parabolic trough solar collector, which receives heat from the sun to heat the cold fluid. Other heat source heat exchangers 134 are also contemplated.

Figure 4A:
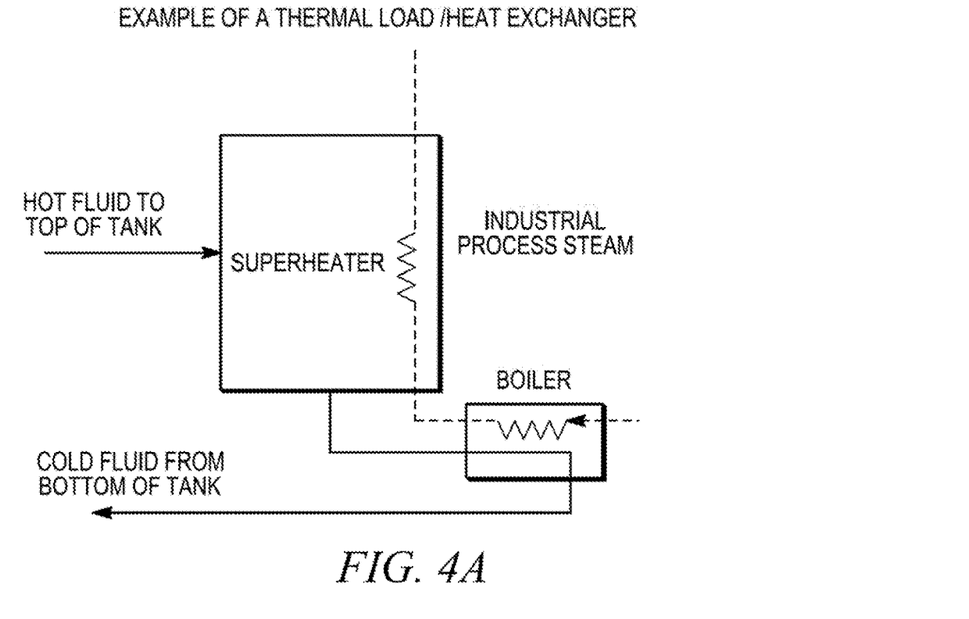
FIG. 4A is a schematic view depicting an exemplary discharge heat exchanger, in accordance with a first embodiment of the disclosure.
Figure 4B:
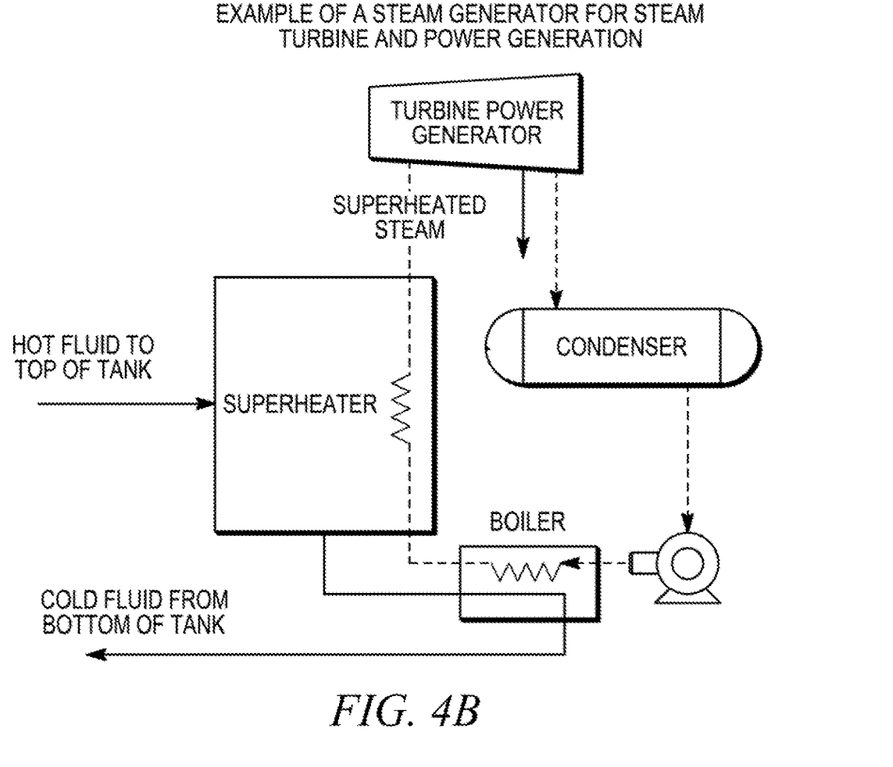
FIG. 4B is a schematic view depicting an exemplary discharge heat exchanger, in accordance with a second embodiment of the disclosure.

In one embodiment, the heat discharged from the discharge heat exchanger 134 can be utilized to make steam or heat a supercritical carbon dioxide or heat transfer fluid, which can be used in a steam turbine to generate power or heat process equipment. FIG. 4A depicts an exemplary industrial heat source to generate processing. FIG. 4B depicts an exemplary steam power generation system using superheated steam to run a steam turbine power generator. Other discharge heat exchangers 136 are also contemplated.

With continued reference to FIG. 2A, various pumps and valves of the thermal storage system 100 are configured to direct the thermal energy storage fluid through various portions of the system during operation. For example, in one embodiment, valve 120 (V1) can be a three-way valve configured to direct fluid from the heat source heat exchanger 134 in the charge mode to the first tank 102 or direct the fluid from the top of the first tank 102 to the discharge heat exchanger 136 during the discharge mode. Similarly, a valve 130 (V6) can be a three-way valve configured to direct fluid from the bottom of first tank 102 to the heat source heat exchanger 134 in the charge mode, or direct fluid from the discharge heat exchanger 136 to the bottom of the tanks during the discharge mode. Valve 126 (V4) can be a two-way (on-off) valve configured to enable flow during the discharge mode and inhibit flow during the charge mode. Valve 128 and 132 (V5 & V7) can be two-way valves configured to disable flow during the discharge mode and enable flow during the charge mode. Valves 122, 124 and 130 (V2, V3 & V6) can be three-way valves configured to be modulated during operation by the process controller 158.

Various temperature sensors 142, 144, 146, 148, and 150 can be utilized throughout the system 100 to monitor the temperature of the thermal energy storage fluid during operation. For example, in one embodiment, temperature sensor 142 can be configured to measure the temperature (T1) of the thermal energy transfer fluid exiting the heat source heat exchanger 134. Temperature sensors 144, 146, and 148 can be configured to measure the temperatures (T2, T3, & T4) of the thermal energy storage fluid exiting each of the respective tanks 102, 104, 106. In one embodiment, all of the measurements from the temperature sensors 142, 144, 146, 148, and 150 can be input into the process controller 158 for aid in determining appropriate operation of the pumps and valves required to maintain the thermocline in the tanks, to properly route fluid through the heat source heat exchanger 134 during the charge mode, and to deliver the required quantity of heat to the discharge heat exchanger 134 during the discharge mode.

In the charge mode, the process controller 158 can be configured to maintain a set point temperature (Tset) of the thermal energy storage fluid (i.e., the high operating temperature of the storage system 100), by modulating (e.g., increasing or decreasing) the fluid flow (F1) rate through pump 138 and/or by modulating control valve 132. In one embodiment, Tset can be measured by temperature sensor 142. The process controller 158 can further determine the positions of valves 120, 122, 124, 126, 128, 130, 132 in order to optimize the thermocline.

Figure 2B:
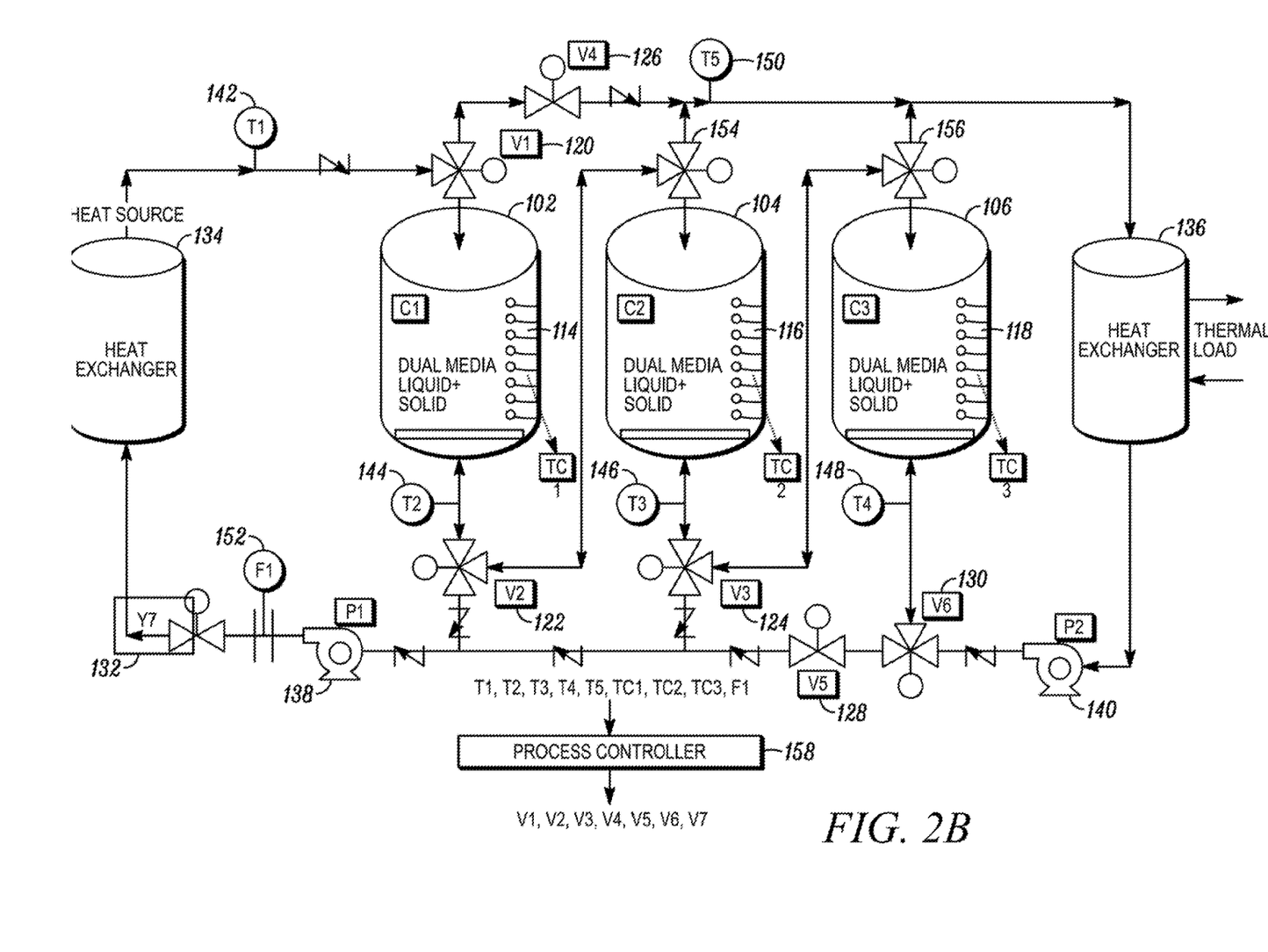
FIG. 2B is a schematic view depicting a thermal storage system, in accordance with a second embodiment of the disclosure.

Referring to FIG. 2B, another embodiment of a thermal storage system 100 with two additional valves 154 and 156 positioned at the top of tanks 104 and 106 respectively, is depicted in accordance with the disclosure. In the charge mode, hot thermal energy storage fluid can be returned to the top of tank 104, once tank 102 has been fully charged with hot fluid. The state of charge of the tanks 102, 104, 106 can be determined by the process controller 158 utilizing data from temperature sensors 114, 116 and 118. In the discharge mode, thermal energy storage fluid can be drawn from the top of any tank as determined by the process controller 158.

Figure 5:
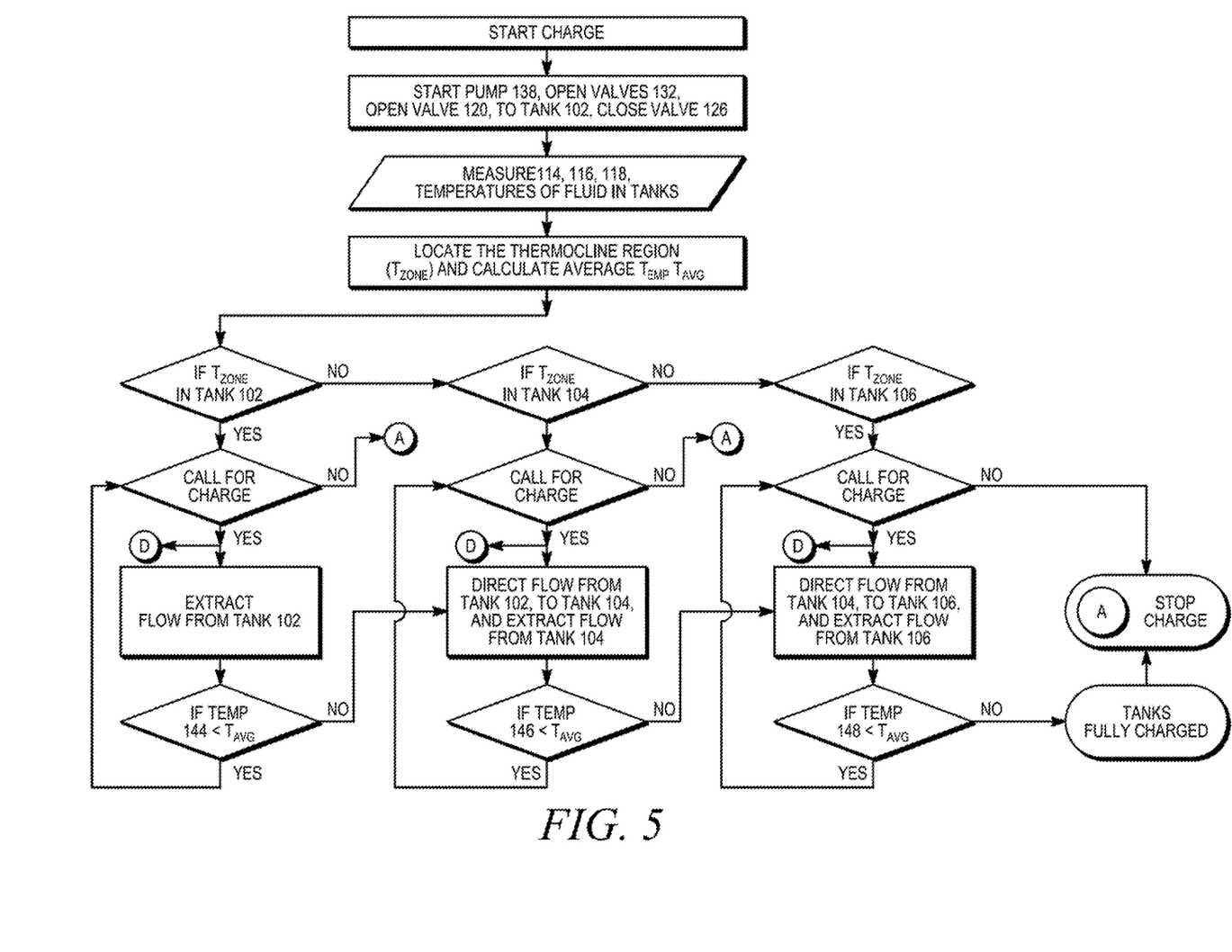
FIG. 5 is a flowchart depicting a control logic method for charging a thermal storage system in a charge mode, in accordance with an embodiment of the disclosure.

Referring to FIG. 5, a control logic flowchart method of charging the thermal storage system 100 via the charge mode is depicted in accordance with an embodiment of the disclosure. On a call for charge from process controller 158, the tank containing the thermocline zone (Tzone) is identified utilizing sensors 114, 116 and 118. Cold thermal energy storage fluid is then drawn from the bottom of the tank and sent to heat source heat exchanger 134. This process continues until the thermocline approaches the bottom of the tank. In one embodiment, determining when the thermocline has approached the bottom of the tank can be accomplished by comparing the temperature of fluid exiting from the bottom of the tank (T2, T3 or T4) with the average thermocline zone temperature (Tavg) of the fluid within the Tzone, which can be computed as the average of the top or high operating temperature and the bottom or low operating temperature.

For example, if the thermocline is in tank 102 and the call for charge is still on, then the fluid is extracted from tank 102 and directed to the heat source heat exchanger 134 until the temperature (T2) of the thermal energy storage fluid, as measured by temperature sensor 144, is greater than Tavg. If T2 is greater than Tavg, then thermal energy storage fluid from tank 102 is directed towards the top of tank 104, and thermal energy storage fluid is drawn from the bottom of tank 104 and directed to the heat source heat exchanger 134. Thermal energy storage fluid is continuing to be drawn from tank 104 until the temperature (T3) of the thermal energy storage fluid, as measured by temperature sensor 146, is greater than Tavg. If T3 is greater than Tavg, then thermal energy storage fluid from tank 104 is directed towards the top of tank 106, and thermal energy storage fluid is drawn from the bottom of tank 106 and directed to the heat source heat exchanger 134. When the temperature (T4) of the fluid exiting tank 106, as measured by temperature sensor 148, equals Tavg, the thermal storage system 100 is fully charged.

Accordingly, the multiple tanks 102, 104, 106 effectively function as a single tall tank, with the top of tank 102 representing a top of the single tall hypothetical tank, and the bottom of tank 106 representing a bottom of the single tall hypothetical tank. As tall tanks naturally have a high utilization factor, utilization of the multiple tanks in this manner promotes efficient storage, while at the same time eliminating the need to construct a single tank of such proportions, thereby providing a significant cost advantage. As an additional benefit, the use of multiple tanks enables reestablishment of the thermocline each time the thermocline passes through the bottom of a tank, thereby minimizing undesirable expansion of the thermocline zone and maintaining the high utilization rate afforded by the multiple tanks connected in series.

In some embodiments, the thermal storage system 100 is further configured to minimize less than efficient use input heat provided by the heat source heat exchanger 134. Operation of the thermal storage system 100 is generally constrained by a maximum flow rate (F1) (e.g., determined by flow rate sensor 152) and a maximum setpoint temperature (Tset) (e.g., determined by temperature sensor 142). In some cases, particularly where the thermocline reaches the bottom of the tank and the fluid passing through the heat source heat exchanger 134 begins to warm, efficient use of heat from the heat source heat exchanger 134 can decrease. In other words, because the temperature of the fluid is limited to a maximum setpoint (Tset) and the fluid flow rate (F1) cannot be increased beyond the determined maximum, some of the heat available to heat the fluid passing through the heat source heat exchanger 134 must be rejected, or otherwise be under-utilized.

Figure 6:
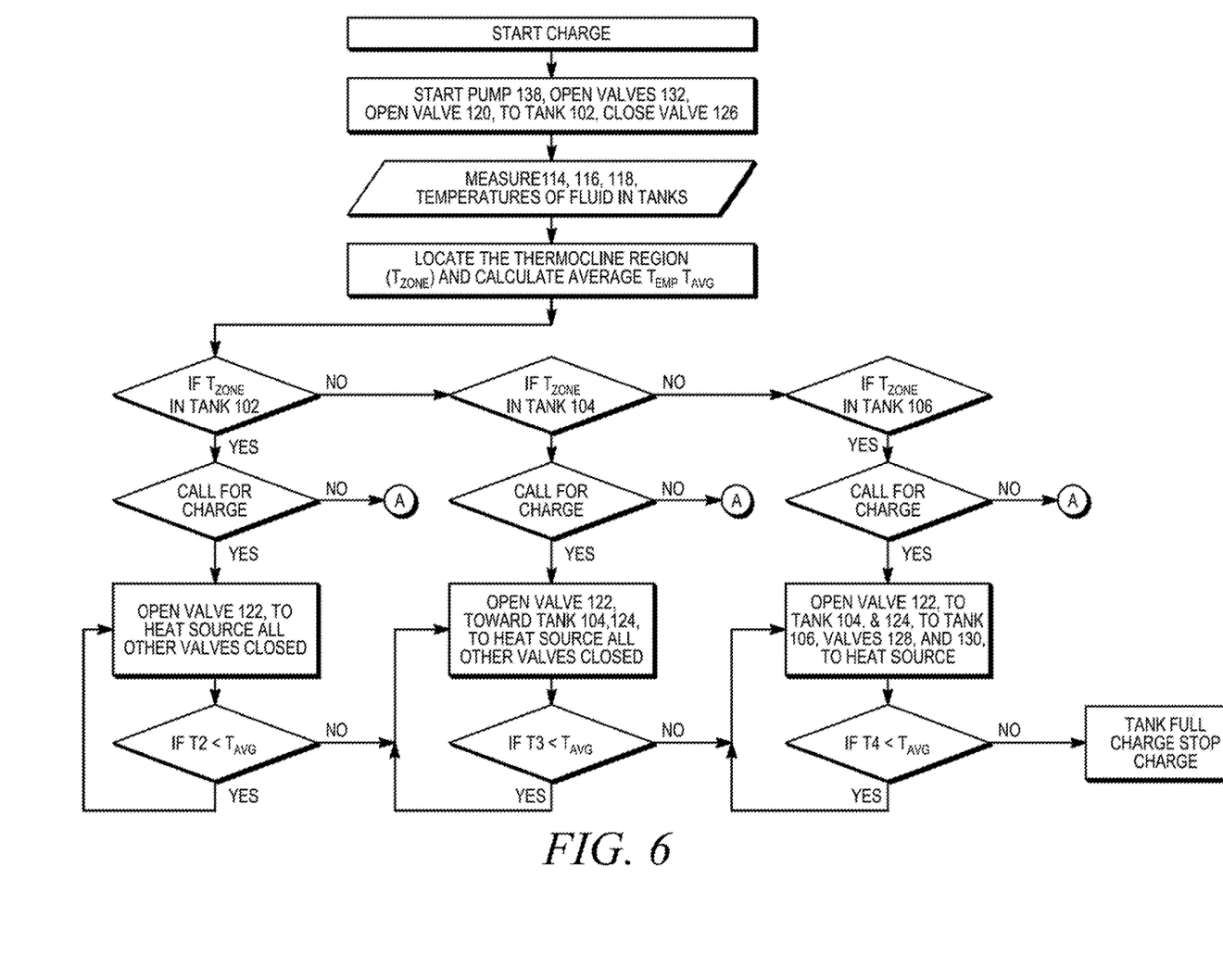
FIG. 6 is a flowchart depicting a control logic method for improving the efficiency of use of a heat source heat exchanger during a charge mode, in accordance with an embodiment of the disclosure.

With Reference to FIG. 6, in an effort to minimize less than efficient use of the heat source heat exchanger 134, fluid from an adjacent cold tank can be mixed with the fluid to be warmed. For example, if during the charge mode, the post heat source heat exchanger 136 temperature (T1) and the associated flow rate (F1) have reached their upper limits, and the fluid being drawn from the bottom of tank 102 has reached a temperature where less than the full amount of heat from the heat source heat exchanger 134 can be absorbed (i.e., when the thermocline approaches the bottom of the tank), the controller 136 can be configured to mix the flow of fluid coming from the bottom of tank 102 with cold fluid from tank 104 to cool the flow of fluid flowing through heat source heat exchanger 134, thereby maximizing heat transfer from the heat source heat exchanger 134 to the fluid. In this manner, for a given flow rate F1, the controller can regulate valves 122, 124 and 130 to ensure that the temperature of the fluid entering the heat source heat exchanger 134 is low enough to utilize all of the available heat from the heat source heat exchanger 134 to heat the fluid passing therethrough. Note that the temperature of fluid exiting the bottom of the respective tanks need not reach Tavg before the controller 136 begins mixing the fluids, rather the mixing may gradually begin as the thermocline approaches all but the last of the tanks 106.

Figure 7:
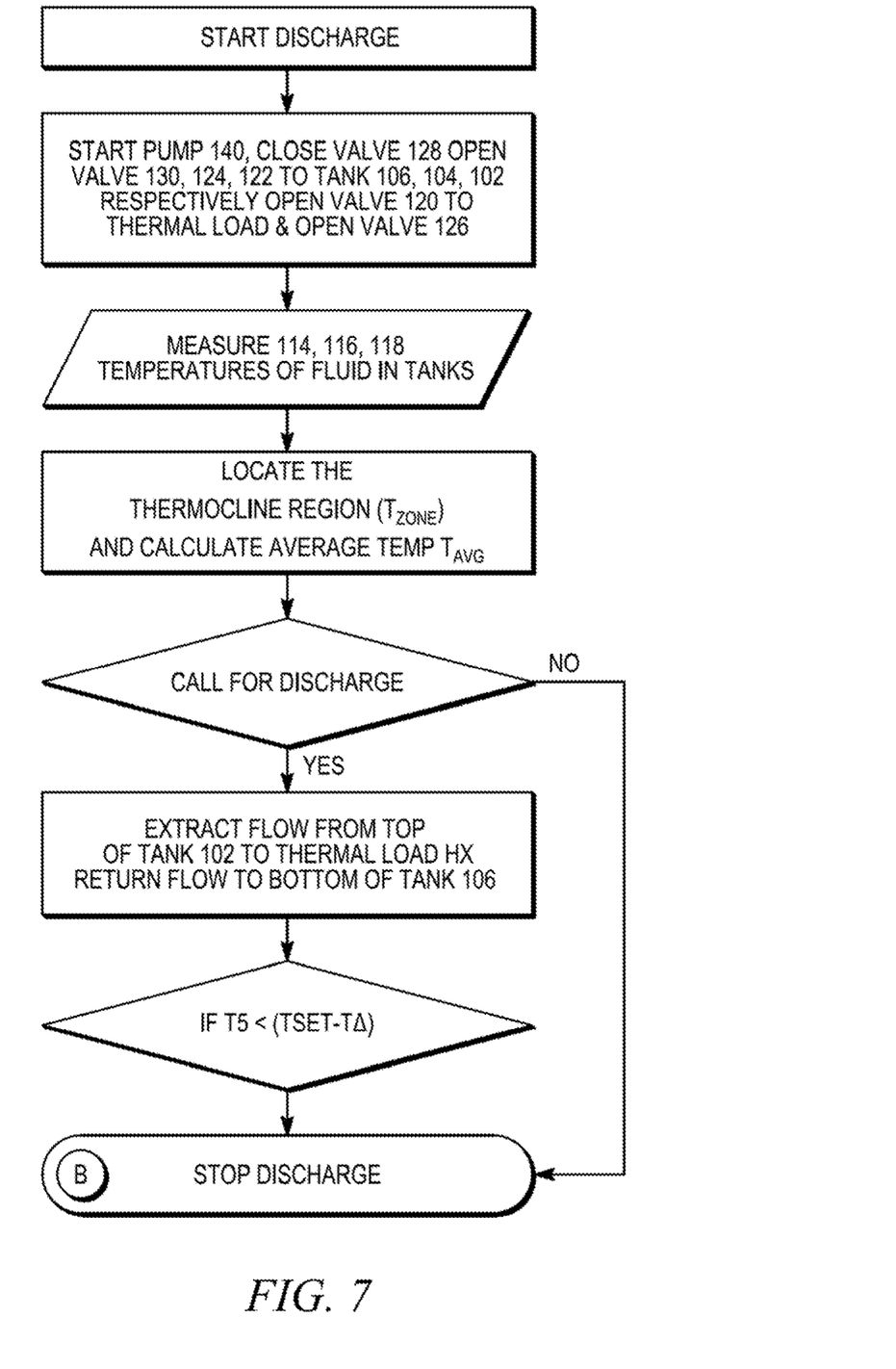
FIG. 7 is a flowchart depicting a control logic method for discharging a thermal system during a discharge mode, in accordance with an embodiment of the disclosure.

Referring to FIG. 7, a control logic method of discharging the thermal storage system 100 via the discharge mode is depicted in accordance with an embodiment of the disclosure. On a call for discharging from the process controller 158, hot fluid is extracted from the top of a tank 102 and sent to the discharge heat exchanger 134. Fluid passing through the discharge heat exchanger 134 is routed through valve 130 into the bottom of tank 106 via pump 140. As cold fluid flows into the bottom of tank 106, hot fluid above the thermocline flows from the top of tank 106 into the bottom of tank 104 via valve 124. Likewise, hot fluid from the top of tank 104 flows through valve 122 into the bottom of tank 102. This process continues until the thermocline passes through the tops of tanks 106, 104 and approaches the top of tank 102. Once the thermocline reaches the top of tank 102, the thermal storage system 100 is considered to be completely discharged.

Alternatively, if when process controller 158 determines that tank 106 is fully discharged, valve 130 can close, and the cold fluid from the discharge heat exchanger 134 can flow directly into the bottom of tank 104 through valve 124. Likewise, if when process controller 158 determines that tank 104 is fully discharged, valve 124 can close and the cold fluid from the discharge heat exchanger 134 can flow directly into the bottom of tank 102 through valve 122 until the thermocline reaches the top of tank 102.

In some embodiments, complete discharge of the thermal storage system 100 can be determined by comparing the temperature (T5) of the fluid exiting the top of tank 102, as determined by temperature sensor 150, with a predefined temperature (Td). In one embodiment, Td can equal Tset minus a loss of heat during storage (TA).

Figure 8:
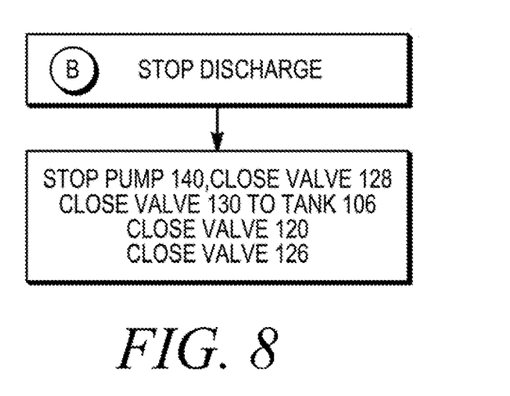
FIG. 8 is a flowchart depicting a control logic method for terminating a discharge mode, in accordance with an embodiment of the disclosure.

Referring to FIG. 8, a control logic method for terminating the discharge mode is depicted in accordance with an embodiment of the disclosure. When termination to the discharge mode is called for, the process controller 158 can stop pump 140, close valve 128, close valve 130 to tank 106, and close valves 120 and 126.

Figure 9:
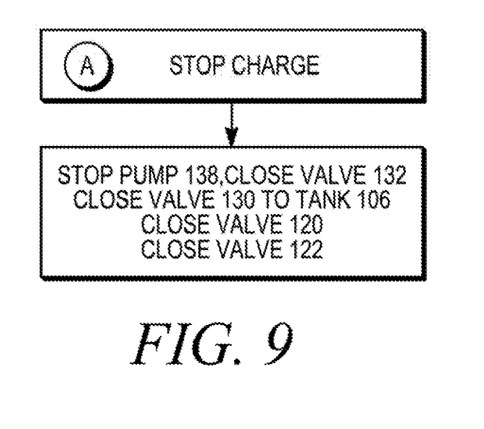
FIG. 9 is a flowchart depicting a control logic method for terminating a charge mode, in accordance with an embodiment of the disclosure.

Referring to FIG. 9, a control logic method for terminating the charge mode is depicted in accordance with an embodiment of the disclosure. When termination to the charge mode is called for, the process controller 158 can stop pump 138, close valve 132, close valve 130 to tank 106, and close valves 120 and 122.

Figure 10:
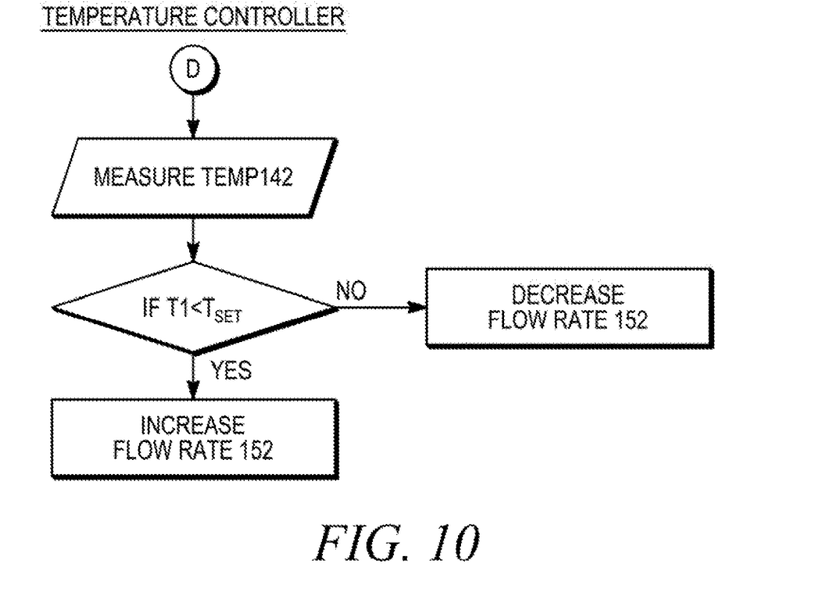
FIG. 10 is a flowchart depicting a control logic method for maintaining a temperature of fluid passing through a heat source heat exchanger, in accordance with an embodiment of the disclosure.

Referring to FIG. 10, a control logic method for maintaining the temperature of fluid passing through the heat source heat exchanger 134 is depicted in accordance with an embodiment of the disclosure. During the charge mode, the temperature T1 can be monitored via temperature sensor 142. If T1 is less than Tset, the process controller 158 can decrease the flow rate of F1, thereby enabling the heat source heat exchanger 134 ample time to fully heat the fluid to the desired Tset as the fluid passes through the heat source heat exchanger. Conversely, if T1 is approaching or exceeds Tset, the process controller 158 can increase t F1. If F1 is increased to the maximum flow rate allowable, a flow of cold fluid from one or more of the other tanks can be utilized to reduce the temperature of the fluid flowing through the heat source heat exchanger 134, as described above.

The control logic methods are described to indicate the direction of flows and the minimum measurements required to implement the control logic. The actual implementation of the control can use more actual or analytical measurements such as predicting the characteristics of the heat source, the thermal load; and other means for measuring the heat content in the thermal storage and location of thermocline zone. In some embodiments, the process controller 158 can be a state-of-art PID controller or a model-based predictive controller, described and practiced by those skilled in the art.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Figure 11:
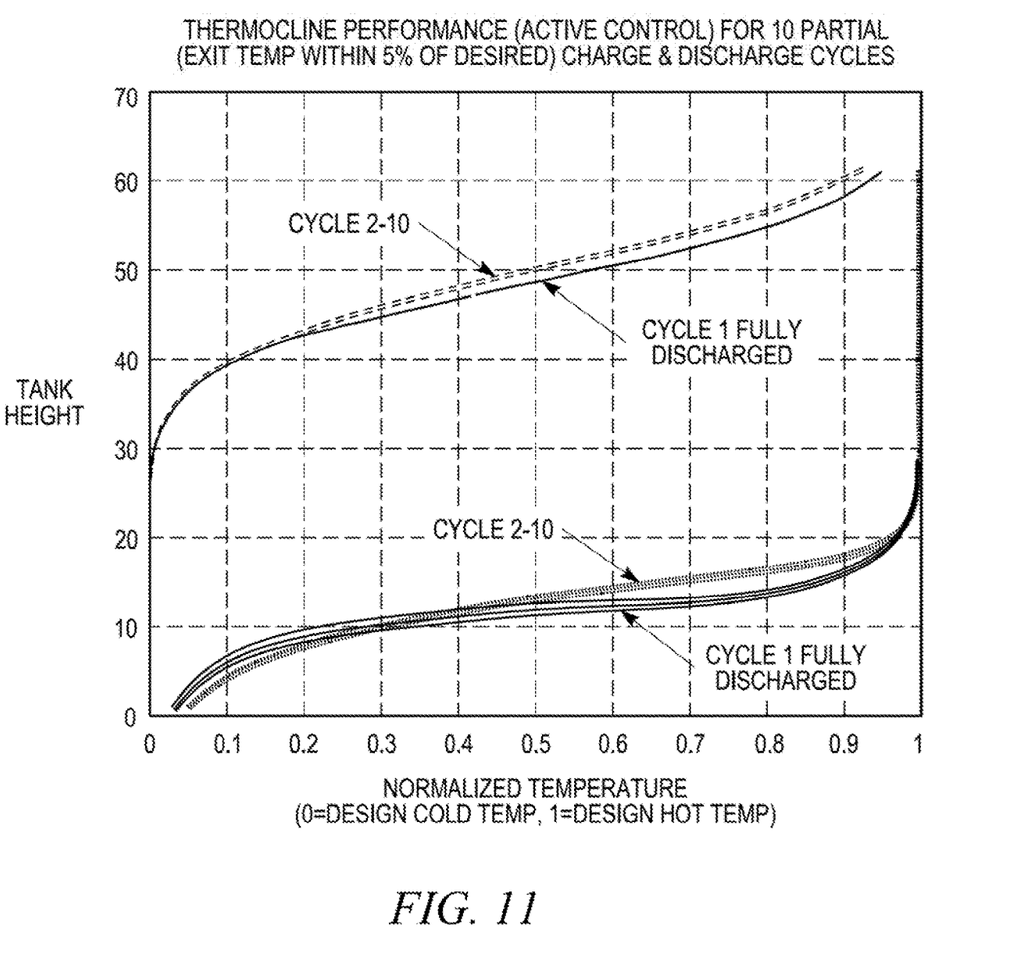
FIG. 11 is a temperature graph depicting thermocline zone degradation for the various embodiments of thermal storage systems, as disclosed herein.

The use of multiple tanks enables reestablishment of the thermocline each time the thermocline passes to the bottom of the tank, thereby minimizing undesirable expansion of the thermocline zone during each charge and discharge cycle. FIG. 11, depicts an exemplary temperature profile in a storage tank over the course of 10 charge and discharge cycles. The y-axis represents the height of the tank, and the x-axis represents the temperature. The top set of curves represent the profile of a fully charged tank, and the bottom set of curves represent the profile of a fully discharged tank. The area between the top and bottom curves is a measure of the utilization factor. As can be seen, particularly in comparison to FIG. 1, the temperature profiles are restored on each charge and discharge cycle, indicating that the utilization factor remains at the design value.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A method of optimizing a thermocline zone within a thermal storage system including a plurality of storage tanks fluidly coupled to one another in series, so as to effectively form a single tank having an equivalent height of the combined height of the plurality of storage tanks, the method comprising:
   identifying a thermocline zone between a hot thermal storage fluid and a cold thermal storage fluid within a plurality of storage tanks;
   computing an average temperature (Tave) of the thermocline zone;
   directing thermal storage fluid from a bottom of an initial storage tank of the plurality of storage tanks containing the thermocline zone to a heat source heat exchanger for heating; and
   terminating fluid flow from the bottom of the initial storage tank and directing thermal storage fluid from a bottom of a first subsequent storage tank of the plurality of storage tanks when a temperature of the thermal storage fluid exiting the bottom of the initial storage tank reaches Tave.

2. The method of claim 1, further comprising directing fluid flow from the bottom of more than one storage tank of the plurality of storage tanks to the heat source heat exchanger to maximize efficient use of available energy during heating.

3. The method of claim 1, further comprising returning the thermal storage fluid passing through the heat source heat exchanger to a top of at least one of the pluralities of storage tanks.

4. The method of claim 1, further comprising terminating fluid flow from the bottom of a preceding storage tank and directing thermal storage fluid from a bottom one or more subsequent storage tanks of the plurality of storage tanks when a temperature of the thermal storage fluid exiting a bottom a proceeding storage tank reaches Tave.

5. The method of claim 1, further comprising ceasing all fluid flow when thermal storage fluid exiting a bottom of the one or more storage tanks reaches Tave.

6. The method of claim 1, wherein a setpoint temperature (Tset) of fluid exiting the heat source heat exchanger is limited by controlling a flow rate of the thermal storage fluid passing through the heat source heat exchanger between a minimum flow rate and a maximum flow rate.

7. The method of claim 1, wherein the thermocline zone is identified using a combination of one or more temperature sensors within the plurality of storage tanks.

8. The method of claim 1, wherein the heat source heat exchanger includes at least one of a solar receiver and/or a renewable thermal source.

9. The method of claim 1, wherein the thermal storage fluid comprises a dual media including a combination of solid media and liquid media.

10. The method of claim 9, wherein the solid media comprises at least one of rock, quartzite, granite, and/or ceramic particles.

11. The method of claim 9, wherein the solid media comprises phase change capsules including an inorganic salt mixture configured to store thermal energy via a phase change.

12. The method of claim 9, wherein the liquid media comprises at least one of hydrocarbon oil and/or molten salt mixture.

13. The method of claim 1, further comprising directing thermal storage fluid from a top of one or more storage tanks of the plurality of storage tanks to a discharge heat exchanger.

14. The method of claim 13, further comprising directing thermal storage fluid from the discharge heat exchanger to a bottom of at least one of the storage tanks.

15. The method of claim 13, wherein the discharge heat exchanger includes at least one of a power generator and/or a steam turbine power generator.

* * * * *